United States Patent
Barnes et al.

(10) Patent No.: US 8,010,134 B2
(45) Date of Patent: Aug. 30, 2011

(54) ARCHITECTURE FOR MOBILE ADVERTISING WITH LOCATION

(75) Inventors: James D. Barnes, Overland Park, KS (US); Peter H. Distler, Overland Park, KS (US); Michael P. McMullen, Leawood, KS (US); Sanjay Kumar Sharma, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 908 days.

(21) Appl. No.: 11/686,179

(22) Filed: Mar. 14, 2007

(65) Prior Publication Data

US 2008/0227467 A1    Sep. 18, 2008

(51) Int. Cl.
H04W 24/00    (2009.01)

(52) U.S. Cl. ............... 455/456.6; 455/404.2; 455/422.1; 455/414.1; 342/357.09

(58) Field of Classification Search .... 455/456.1–456.6, 455/404.2; 342/357.09
See application file for complete search history.

(56) References Cited

U.S. PATENT DOCUMENTS

| | | | |
|---|---|---|---|
| 6,249,252 B1 | 6/2001 | Dupray | |
| 6,405,044 B1 | 6/2002 | Smith et al. | |
| 6,449,486 B1 * | 9/2002 | Rao | 455/456.1 |
| 6,505,046 B1 | 1/2003 | Baker | |
| 6,760,582 B2 | 7/2004 | Gaal | |
| 6,801,778 B2 * | 10/2004 | Koorapaty et al. | 455/456.1 |
| 6,961,367 B2 | 11/2005 | Simic et al. | |
| 7,092,722 B1 | 8/2006 | Oh et al. | |
| 7,343,317 B2 | 3/2008 | Jokinen et al. | |
| 7,376,430 B2 * | 5/2008 | Matsuda | 455/456.2 |
| 7,400,884 B2 * | 7/2008 | Fok et al. | 455/414.2 |
| 7,945,271 B1 | 5/2011 | Barnes et al. | |
| 2002/0086680 A1 * | 7/2002 | Hunzinger | 455/456 |
| 2003/0008668 A1 | 1/2003 | Perez-Breva et al. | |
| 2003/0065805 A1 | 4/2003 | Barnes, Jr. | |
| 2004/0140361 A1 | 7/2004 | Paul et al. | |
| 2004/0198386 A1 * | 10/2004 | Dupray | 455/456.1 |
| 2004/0243519 A1 | 12/2004 | Perttila et al. | |
| 2005/0192024 A1 * | 9/2005 | Sheynblat | 455/456.1 |

(Continued)

FOREIGN PATENT DOCUMENTS

WO    2008112401 A1    9/2008

OTHER PUBLICATIONS

Lightningcast, Inc., "Lightningcast Mobile Video Advertising Solution," May 2, 2005, 14 pgs.

(Continued)

Primary Examiner — Kamran Afshar
Assistant Examiner — Vladimir Magloire (57) ABSTRACT

Systems and methods are provided for mobile device advertising. The system includes a mobile device, a content provider, and an advertisement provider. A plurality of location fix technologies is executed to determine a plurality of location fixes for the mobile device, and the plurality of location fixes is stored in the mobile device. A location request is received for the mobile device, the plurality of stored location fixes is retrieved from the mobile device, and the plurality of stored location fixes is sent to the content provider. The content provider receives the plurality of location fixes for the mobile device from the mobile device, forwards the plurality of location fixes to the advertisement provider, and transmits content to the mobile device. The advertisement provider selects an advertisement based on location fixes, and transmits the advertisement to the mobile device.

28 Claims, 6 Drawing Sheets

| | LOCATION DATA | | |
|---|---|---|---|
| | LOCATION FIX TECHNOLOGY | LOCATION FIX | LOCATION FIX TIME |
| 410 | CELL TOWER LOCATION | CELL TOWER #1844 | 3:03:30 PM 02-05-2006 |
| 412 | CELL SECTOR CENTROID | CELL TOWER #1844 SECTOR ALPHA | 3:03:30 PM 02-05-2006 |
| 414 | ADVANCED FORWARD LINK TRILATERATION | LATITUDE 42° 25' N LONGITUDE 83° 01' W | 3:03:10 PM 02-05-2006 |
| 416 | GLOBAL POSITIONING SYSTEM | LATITUDE 42° 25' N LONGITUDE 83° 01' W | 3:00:40 PM 02-05-2006 |
| 418 | HYBRID | LATITUDE 42° 25' N LONGITUDE 83° 01' W | 3:01:59 PM 02-05-2006 |

(labels: 402, 404, 406, 408)

U.S. PATENT DOCUMENTS

| | | | |
|---|---|---|---|
| 2006/0089153 | A1 | 4/2006 | Sheynblat |
| 2006/0178932 | A1 | 8/2006 | Lang |
| 2007/0161380 | A1 | 7/2007 | Fok et al. |
| 2008/0010114 | A1 | 1/2008 | Head |
| 2008/0119206 | A1* | 5/2008 | Shalmon et al. ........... 455/456.3 |

OTHER PUBLICATIONS

International Searching Authority, International Search Report and the Written Opinion of the International Searching Authority dated Jun. 5, 2008, International Application Serial No. PCT/US08/54657, international filing date Feb. 22, 2008.

Foreign Communication From a Related Counterpart Application—International Preliminary Report on Patentability, PCT/CN2008/054657, Sep. 24, 2008, 6 pages.

Barnes, James D., et al., "Location Inference Using Radio Frequency Fingerprinting," U.S. Appl. No. 11/779,900, filed Jul. 19, 2007.

Barnes, James D., et al., "Coupon Validation Using Radio Frequency Fingerprinting," U.S. Appl. No. 11/779,045, filed Jul. 17, 2007.

Izdepski, Erich J., et al., et al., "System and Method for Mobile Device Self-Location," U.S. Appl. No. 12/543,451, filed Aug. 18, 2009.

Oh, Dae-Sik, et al., et al., et al., "Mobile-Implemented Method and System for Performing a Handoff Based on Mobile Station Location," U.S. Appl. No. 10/784,612, filed Feb. 23, 2004.

Office Action dated Jan. 7, 2010, U.S. Appl. No. 11/779,045, filed Jul. 17, 2007, 23 pages.

Office Action dated Jun. 25, 2010, U.S. Appl. No. 11/779,900, filed Jul. 19, 2007, 22 pages.

Final Office Action dated Jul. 8, 2010, U.S. Appl. No. 11/779,045, filed Jul. 17, 2007, 30 pages.

Advisory Action dated Oct. 5, 2010, U.S. Appl. No. 11/779,045, filed Jul. 17, 2007.

Notice of Allowance dated Dec. 10, 2010; U.S. Appl. No. 11/779,900, filed Jul. 19, 2007.

Supplemental Notice of Allowance dated Feb. 17, 2011; U.S. Appl. No. 11/779,900, filed Jul. 19, 2007.

* cited by examiner

| LOCATION DATA | | |
|---|---|---|
| LOCATION FIX TECHNOLOGY | LOCATION FIX | LOCATION FIX TIME |
| CELL TOWER LOCATION | CELL TOWER #1844 | 3:03:30 PM 02-05-2006 |
| CELL SECTOR CENTROID | CELL TOWER #1844 SECTOR ALPHA | 3:03:30 PM 02-05-2006 |
| ADVANCED FORWARD LINK TRILATERATION | LATITUDE 42° 25' N LONGITUDE 83° 01' W | 3:03:10 PM 02-05-2006 |
| GLOBAL POSITIONING SYSTEM | LATITUDE 42° 25' N LONGITUDE 83° 01' W | 3:00:40 PM 02-05-2006 |
| HYBRID | LATITUDE 42° 25' N LONGITUDE 83° 01' W | 3:01:59 PM 02-05-2006 |

Fig. 4B

ARCHITECTURE FOR MOBILE ADVERTISING WITH LOCATION

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Mobile devices include applications, such as web browsers, that can request content from content providers, such as website servers. Content providers can enable advertisement providers to supplement the requested content with advertisements. In general, advertisement providers pay higher prices for advertisements that reach specific intended audiences because targeted advertisements increase the chances of favorable responses to the advertisement.

For example, an advertisement provider designs a football-related advertisement for mobile device users attending a football game played in a football stadium. The mobile device users attending the football game are likely to have sufficient interest and sufficient disposable income to respond favorably to the advertisement, based on the expensive ticket prices for the football game. However, the advertiser provider does not want to pay higher prices to send this advertisement to numerous mobile device users who are not attending the football games, for these mobile device users are not as likely to have sufficient interest and sufficient disposable income to respond favorably to the advertisement. Therefore, advertisement providers would only want to pay for sending such advertisements to targeted mobile device users. Targeted advertisements require the geographic locations of mobile devices to be identified. But advertisement providers have problems with targeted advertisements based on the geographic locations of mobile devices.

For example, if a mobile phone user activates a web browser to request news content from a news website server, the website server may have a limited amount of time to request an advertisement from an advertisement provider. The advertisement provider may not have time to request the mobile phone to identify the location of the mobile phone, to receive the identified location of the mobile phone, to process the received location of the mobile phone, to select a advertisement for a specific intended audience based on the processed location, and to convey this selected advertisement to the content provider.

SUMMARY

The present disclosure provides systems and methods for mobile advertising with location. In some method embodiments, multiple location fix technologies are executed to determine location fixes for a mobile device. The location fixes are stored in the mobile device, where at least one of them can be obtained by an advertisement provider to select an advertisement and transmit the advertisement to the mobile device. In some alternative embodiments, the mobile device sends at least one of the location fixes to a content provider as part of a request for content.

Some system embodiments include a mobile device, a content provider, and an advertisement provider. The content provider receives at least one location fix for the mobile device from the mobile device based on multiple location fix technologies, forwards at least one location fix to the advertisement provider, and transmits content to the mobile device. The advertisement provider selects an advertisement based on at least one location fix, and transmits the advertisement to the mobile device.

These and other features and advantages will be more clearly understood from the following detailed description taken in conjunction with the accompanying drawings and claims.

BRIEF DESCRIPTION OF THE DRAWINGS

For a more complete understanding of the presentation and the advantages thereof, reference is now made to the following brief description, taken in connection with the accompanying drawings in detailed description, wherein like reference numerals represent like parts.

DETAILED DESCRIPTION

It should be understood at the outset that although implementations of various embodiments of the present disclosure are described below, the present system may be implemented using any number of techniques, whether currently known or in existence. The present disclosure should in no way be limited to the implementations, drawings, and techniques described below, but may be modified within the scope of the appended claims along with their full scope of equivalents.

To enable fast and efficient location information for use in location-based advertising, some embodiments of the present disclosure periodically execute multiple location technologies and periodically store multiple location fixes on the mobile device. The multiple location fixes can include location fixes of varying accuracies stored at varying times. As part of a request for content, the mobile device sends at least one of the location fixes to the content provider. The content provider can forward at least one location fix to an advertisement provider and transmit content to the mobile device. The advertisement provider can select an advertisement designed for a specific location based on at least one location fix and can transmit the advertisement to the mobile device. Advertisement providers can determine whether to use the most accurate location fix, the most recent location fix, or a location fix that is both somewhat accurate and somewhat recent. The advertisement provider may be willing to pay the content provider more for the location-based advertisement because of the greater likelihood that the recipients of such targeted advertisements will respond favorably to the advertisement.

Figure 1:
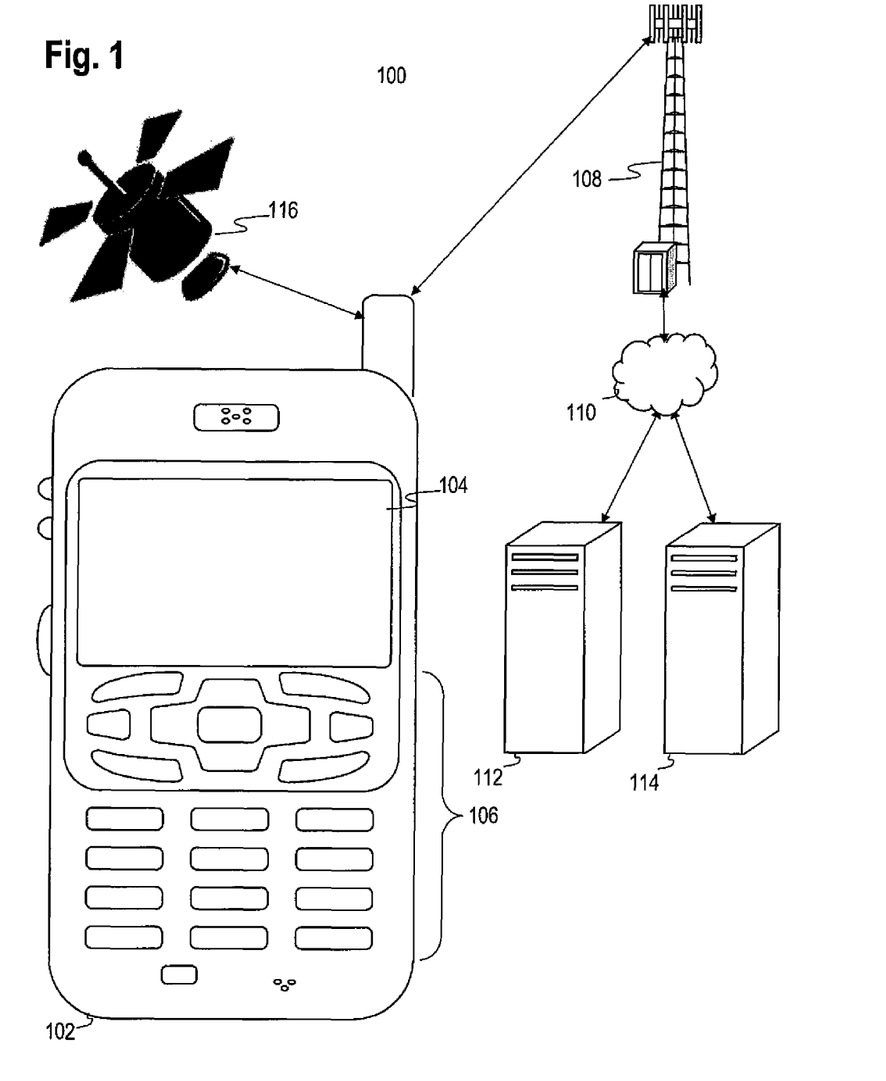
FIG. 1 shows an illustrative wireless communications system for mobile device advertising.

FIG. 1 shows a wireless communications system 100 that illustrates the context for the systems and methods of the present disclosure. The wireless communication system includes an illustrative mobile device 102. Though illustrated as a mobile phone, the mobile device 102 may take various forms including a personal digital assistant (PDA), a mobile computer, a digital camera, and a digital music player. Many suitable mobile devices combine some or all of these functions.

The mobile device 102 includes a display 104 and a touch-sensitive surface or keys 106 with which to interact with a user. The mobile device 102 may present options for the user to select, controls for the user to actuate, and/or cursors or other indicators for the user to direct. The mobile device 102 may further accept data entry from the user, including numbers to dial or various parameter values for configuring the operation of the mobile device 102. The mobile device 102 may further execute one or more software or firmware applications in response to user commands. These applications may configure the mobile device 102 to perform various customized functions in response to user interaction, including web browsing and location determination.

In the illustrative system 100, the mobile device 102 communicates through a cell tower 108 and a wired or wireless network 110 to access information on various servers, such as a content server 112. The content server 112 in turn interacts with an advertisement provider server 114 through the network 110. While one application provider server is shown in FIG. 1, other servers could be present. The illustrative content server 112 acts as a gateway to advertisement provider server 114, which provides information such as advertisements to transmit to the mobile device 102. The advertisement provider server 114 interacts with the content server 112, which communicates with the mobile device 102 through the network 110 and the cell tower 108 by a standard wireless telephony protocol (such as code division multiple access), a wireless internet connection, or some other means of wireless communication. Although the content provider server 112 and the advertisement provider server 114 are depicted separately in FIG. 1, the functions of the content provider server 112 and the functions of the advertisement provider server 114 can be combined on one server.

The mobile device 102 may communicate with a satellite 116, which can use a global positioning system technology or a similar satellite-based positioning system to determine a geographical position or location for the mobile device 102. Global positioning system satellites transmit signals that are received by the mobile device 102. The mobile device 102 triangulates its position based on the different signals received from different satellites.

Figure 2:
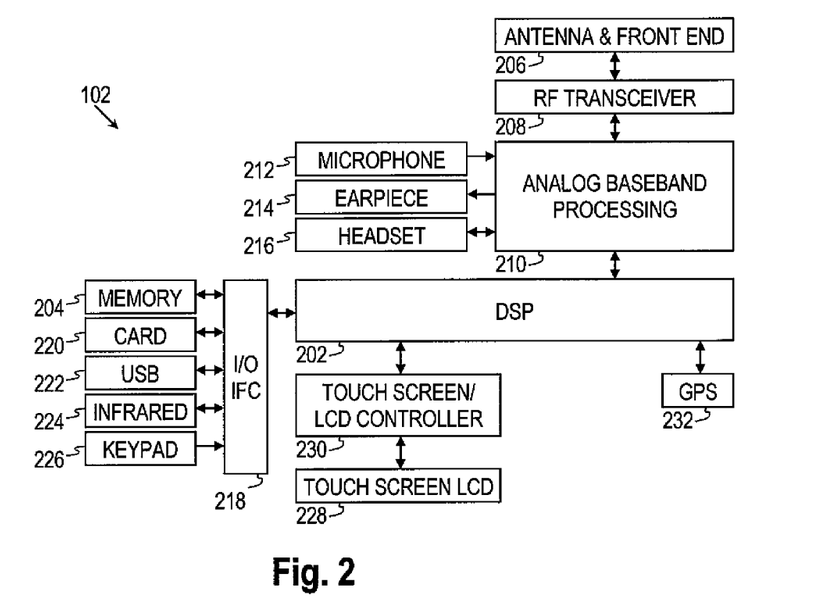
FIG. 2 shows a block diagram of an illustrative mobile device.

FIG. 2 shows a block diagram of the mobile device 102. The mobile device 102 includes a digital signal processor (DSP) 202 and a memory 204. As shown, the mobile device 102 may further include an antenna and front end unit 206, a radio frequency (RF) transceiver 208, an analog baseband processing unit 210, a microphone 212, an earpiece speaker 214, a headset port 216, an input/output interface 218, a memory card 220, a universal serial bus (USB) port 222, an infrared port 224, a keypad 226, a liquid crystal display (LCD) with a touch sensitive surface 228, a touch screen/LCD controller 230, and a global positioning system (GPS) sensor 232.

The DSP 202 or some other form of controller or central processing unit operates to control the various components of the mobile device 102 in accordance with embedded software or firmware stored in the memory 204. In addition to the embedded software or firmware, the DSP 202 may execute other applications stored in the memory 204 or made available via information carrier media such as portable data storage media like the memory card 220 or via wired or wireless network communications. The application software may comprise a compiled set of machine-readable instructions that configure the DSP 202 to provide the desired functionality, or the application software may be high-level software instructions to be processed by an interpreter or compiler to indirectly configure the DSP 202.

The antenna and front end unit 206 converts between wireless signals and electrical signals, enabling the mobile device 102 to send and receive information from a cellular network or some other available wireless communications network. The RF transceiver 208 provides frequency shifting, e.g., converting received RF signals to baseband and converting baseband transmit signals to RF. The analog baseband processing unit 210 provides channel equalization and signal demodulation to extract information from received signals, modulates information to create transmit signals, and provides analog filtering for audio signals. To that end, the analog baseband processing unit 210 includes ports for connecting to the built-in microphone 212 and the earpiece speaker 214 that enable the mobile device 102 to be used as a cell phone.

The DSP 202 can send and receive digital communications with a wireless network via the analog baseband processing unit 210. The input/output interface 218 interconnects the DSP 202 and various memories and interfaces. The memory 204 and the removable memory card 220 may provide software and data to configure the operation of the DSP 202. The infrared port 224 and other optional ports such as a Bluetooth interface or an IEEE 802.11 compliant wireless interface enable the mobile device 102 to communicate wirelessly with other nearby mobile devices and/or wireless base stations. In some contemplated systems, the mobile device 102 is able to wirelessly exchange information at a point-of-sale when placed near a suitable transceiver.

The keypad 226 couples to the DSP 202 via the I/O interface 218 to provide one mechanism for the user to make selections, enter information, and otherwise provide input to the mobile device 102. Another input mechanism may be the touch screen display 228, which may also display text and/or graphics to the user. The display controller 230 couples the DSP 202 to the touch screen display 228.

The GPS sensor 232 is coupled to the DSP 202 to decode global positioning system signals, thereby providing at least one technology for the mobile device 102 to determine its position. Various other peripherals may also be included to provide additional functions, e.g., radio and television reception.

Figure 3:
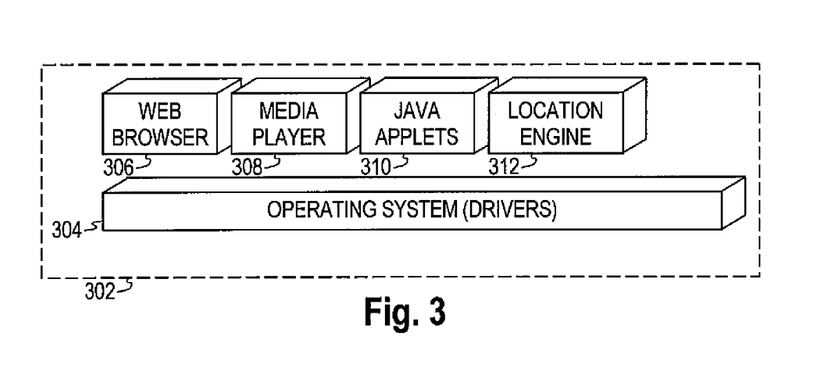
FIG. 3 shows a block diagram of an illustrative software configuration for mobile device advertising.

FIG. 3 illustrates a software environment 302 that may be implemented by the DSP 202. The DSP 202 executes operating system software 304 that provides a platform from which the rest of the software operates. The operating system software 304 provides drivers for the mobile device hardware to make standardized interfaces available to application software. The operating system software 304 may transfer control between applications running on the mobile device 102.

Also shown in FIG. 3 are a web browser 306 application, a media player 308, application Java applets 310, and a location engine 312 application. The web browser 306 application configures the mobile device 102 to operate as a web browser, allowing the user to enter information into forms and select links to retrieve and view web pages, including content from the content server 112. The media player 308 application configures the mobile device to retrieve and play audio or audiovisual media on its own output components. The Java applets 310 may configure the mobile device 102 to provide games, utilities, and other functionality on the mobile device 102. These are further examples of content that may be provided by the content server 112.

The location engine 312 application executes location fix technologies to determine location fixes for the mobile device 102, and store the location fixes on the mobile device. The location engine 312 application also receives location requests for stored location fixes for the mobile device 102, retrieves the location fixes on the mobile device 102, and sends the location fixes to a content provider, which can be the content provider server 112.

Figure 4A:
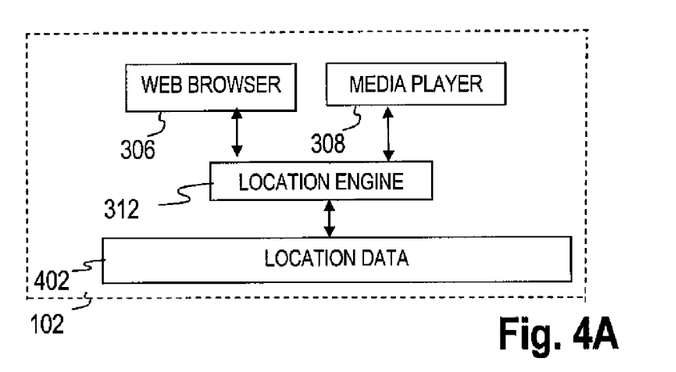
FIG. 4A shows a block diagram of a system for mobile device advertising according to some embodiments of the present disclosure.

FIG. 4A shows a block diagram of a system for mobile device advertising according to some embodiments of the present disclosure. The mobile device 102 contains the web browser 306 application, the media player 308 application, and the location engine 312 application. When either the web browser 306 application or the media player 308 application are invoked to request content, then either the web browser 306 application or the media player 308 application sends a location request for location fixes for the mobile device 102 to the location engine 312 application. The location engine 312 application retrieves at least one of the location fixes from location data 402 stored on the mobile device 102. By sending at least one location fix to either the web browser 306 application or the media player 308 application, the location engine 312 application indirectly sends at least one location fix to the content provider server 112 because either the web browser 306 application or the media player 308 application can include at least one location fix with the content request sent to the content provider server 112.

Additionally, the advertisement provider server 114 can indirectly send a location request to the location engine 312 application. For example, the advertisement provider server 114 can select an advertisement based on a low accuracy location fix for the mobile device 102, and include a request for a high accuracy location fix along with the advertisement that is transmitted to the mobile device 102. Upon receiving the request for a high accuracy location fix, the location engine 312 application can respond by executing a location fix technology to determine a high accuracy location fix for the mobile device 102.

Figure 4B:
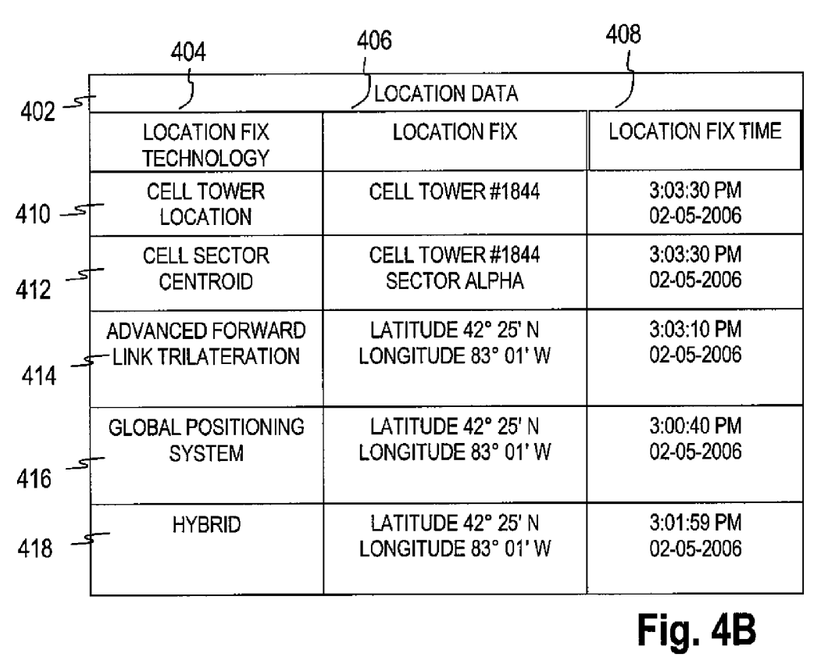
FIG. 4B shows location data for mobile device advertising according to some embodiments of the present disclosure.

FIG. 4B shows a block diagram of the location data 402 for mobile device advertising according to some embodiments of the present disclosure. The location data 402 includes a location fix technology 404 column, a location fix 406 column, and a location fix time 408 column. The location fix technology 404 column includes rows for each type of location fix technology used by the mobile device 102, such as a cell tower location 410 technology, a cell sector centroid 412 technology, an advanced forward link trilateration 414 technology, a global positioning system 416 technology, and a hybrid 418 technology.

The location fix technologies can include network intensive location fix technologies that produce high accuracy location fixes, such as the advanced forward link trilateration 414 technology, and time intensive location fix technologies that produce high accuracy location fixes, such as the global positioning system 416 technology. The location fix technologies can also include time intensive location fix technologies that produce high accuracy location fixes, such as the hybrid 418 technology, and non-intensive location fix technologies that produce low accuracy location fixes, such as the cell tower location 410 technology and the cell sector centroid 412 technology. Execution of network intensive location fix technologies requires a significant amount of network resources and takes a significant amount of time to complete. Execution of time intensive location fix technologies takes a significant amount of time to complete. Execution of non-intensive location fix technologies does not require a significant amount of network resources and does not take a significant amount of time to complete.

The cell tower location 410 technology fixes the location of the mobile device 102 based on the cell tower used by the mobile device 102 for communication. For example, the location fix 406 column identifies "cell tower #1844" in the cell tower location 410 technology row as the cell tower used by the mobile device 102 for communication. The location fix time 408 column identifies "3:03:30 PM 02-05-2006" in the cell tower location 410 technology row as the time that the cell tower location 410 technology fixed the location for the mobile device 102. The location engine 312 application executes the cell tower location 410 technology in background to fix the location of the mobile device 102 when the mobile device 102 is in use.

The cell sector centroid 412 technology fixes the location of the mobile device 102 based on the cell tower and the cell sector used by the mobile device 102 for communication. For example, the location fix 406 column identifies "cell tower #1844 sector alpha" in the cell sector centroid 412 technology row as the cell tower and cell sector used by the mobile device 102 for communication. The location fix time column 408 identifies "3:03:30 PM 02-05-2006" in the cell sector centroid 412 technology row as the time that the cell sector centroid 412 technology fixed the location for the mobile device 102. The location engine 312 application executes the cell sector centroid 412 technology in background to fix the location of the mobile device 102 when the mobile device 102 is in use.

Cell sectors are sub-regions of a coverage area for a cell tower, but because cell sectors change dynamically based on usage requirements, cell sectors do not necessarily identify specific geographical locations. Although a cell sector cannot independently fix a location for the mobile device 102, the cell sector can fix the location of the mobile device 102 when used with another location fix technology. For example, if a high accuracy location fix technology fixes the location for a first mobile device that is also using cell tower #1844 and cell sector alpha to communicate, and a second mobile device is also using cell tower #1844 and cell sector alpha to communicate, then the location for the second mobile device can be fixed as within two miles of the first mobile device if the sectors for cell tower #1844 are limited to cover areas of only two miles.

The advanced forward link trilateration 414 technology fixes the location of the mobile device 102 based on measurements taken of time and distance signals from nearby cell towers. The mobile device 102 reports the time and distance measurements to the network 110, then the network 110 triangulates a location fix of the mobile device 102 within a 1000 meter accuracy, and reports the location fix back to mobile device 102. In general, at least three surrounding cell towers are required to triangulate an optimal location fix. For example, the location fix 406 column identifies "latitude 42° 25' longitude 83° 01'" in the advanced forward link trilateration 414 technology row as the latitude and the longitude for the mobile device 102. The location fix time column 408 identifies "3:03:10 PM 02-05-2006" in the advanced forward link trilateration 414 technology row as the time that the advanced forward link trilateration 414 technology fixed the location for the mobile device 102. Because of the time required to measure signals from multiple cell towers, to report the measurements to the network 1101 to triangulate the location fix, and to report the location fix back to the mobile device 102, the advanced forward link trilateration 414 technology requires significant amounts of both time and resources from the mobile device 102 and the network 110. Therefore, although the advanced forward link trilateration 414 technology determines high accuracy location fixes, the location engine 312 application executes the advanced forward link trilateration 414 technology in background infrequently for periodic updates of the location fixes.

The global positioning system 416 technology fixes the location of the mobile device 102 based on a group of at least 24 well-spaced satellites that orbit the earth and enable the determination of a location fix for the mobile device 102. The location accuracy is anywhere from 1 to 100 meters depending on the type of equipment used. The global positioning system 416 technology is owned and operated by the U.S. Department of Defense, but is available for general use around the world.

For example, the location fix 406 column identifies "latitude 42° 25' longitude 83° 01'" in the global positioning system 416 technology row as the latitude and the longitude for the mobile device 102. The location fix time column 408 identifies "3:00:40 PM 02-05-2006" in the global positioning system 416 technology row as the time that the global positioning system 416 technology fixed the location for the mobile device 102. The global positioning system 416 technology requires a direct line of sight between the mobile device 102 and 4 or more satellites to fix the location of the mobile device, such as when the mobile device is outdoors. Although the global positioning system 416 technology determines high accuracy location fixes, this technology cannot determine location fixes for mobile devices that are indoors. Therefore, the location engine 312 application executes the global positioning system 416 technology in background infrequently for periodic updates of the location fixes.

The hybrid 418 technology fixes the location of the mobile device 102 based on a combination of the other location fix technologies. For example, if the mobile device 102 is indoors, but close to a window, the global positioning system 416 technology in combination with the cell tower location 410 technology can calculate the location fix for the mobile device 102. Because the mobile device 102 is indoors, the mobile device 102 receives signals from an insufficient number of satellites to triangulate the position of the mobile device 102. However, the hybrid 418 technology combines the signals from the insufficient number of satellites with the cell tower location identified by the cell tower location 410 technology to calculate a hybrid location fix for the mobile device 102. Continuing this example, the location fix 406 column identifies "latitude 42° 25' longitude 83° 01'" in the hybrid 418 technology row as the latitude and the longitude for the mobile device 102. The location fix time column 408 identifies "3:01:59 PM 02-05-2006" in the hybrid 418 technology row as the time that the hybrid 418 technology fixed the location for the mobile device 102.

Although the location data 402 depicts only one entry for the location fix 406 column and only one entry for the location fix time 408 column, the location data 402 can store at least some of multiple location fixes at different times and multiple location fix times for each type of location fix technology 404. The advertisement provider server 114 can use the multiple location fixes and multiple location fix times for each type of location fix technology 404 to determine the location of the mobile device 102. For example, if the cell sector centroid 412 technology determined the location fix for the mobile device 102 as "cell tower #1844 sector alpha" both currently and three minutes ago, then the general location of the mobile device has not changed. Therefore, if the global positioning system 416 technology determined the location fix for the mobile device 102 three minutes ago, the advertisement provider server 114 can determine that the mobile device 102 is currently within two miles of the location fix determined three minutes ago by the global positioning system 416 technology. In one example, the cell sector centroid 412 technology determine the location fix for the mobile device 102 during the most recent time period and during time periods matching the most recent location fixes of each other location fix technology.

Figure 5:
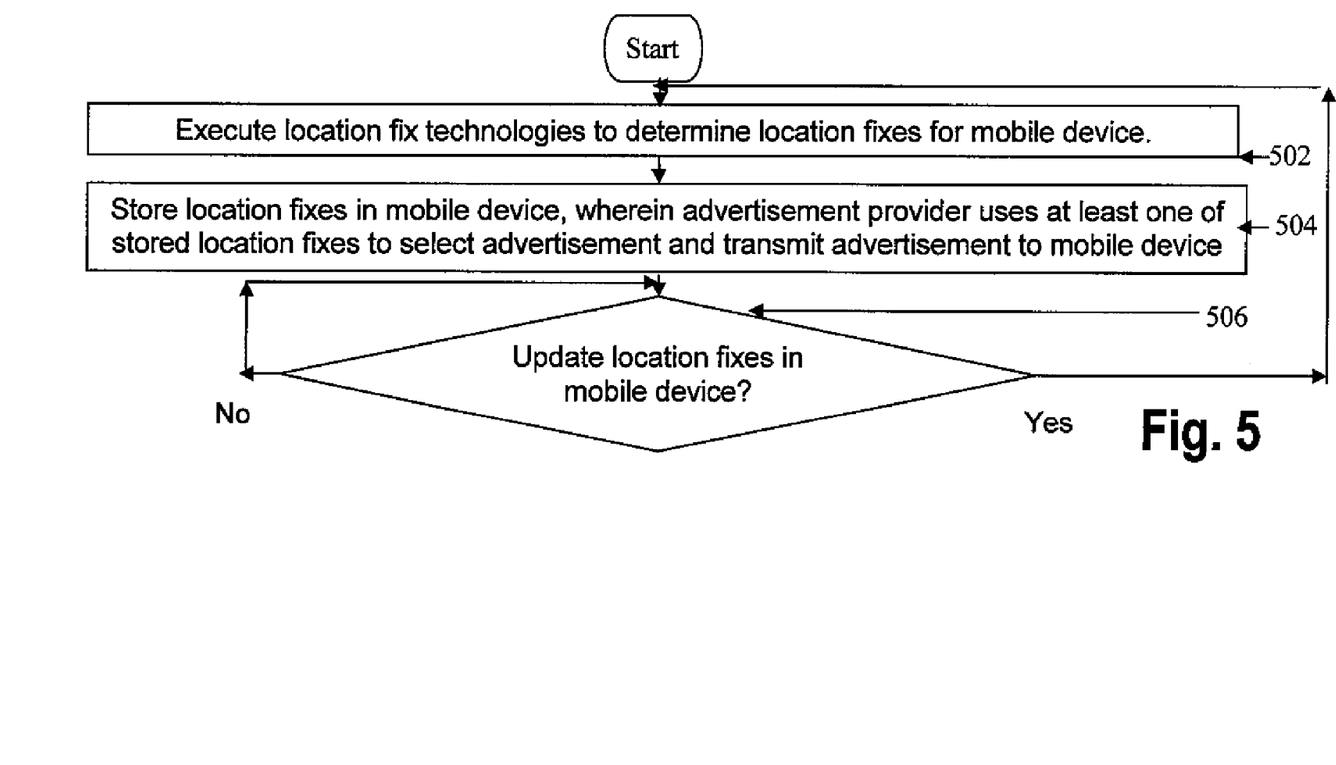
FIG. 5 shows a flowchart of a method for mobile device advertising according to some embodiments of the present disclosure.

FIG. 5 is a flowchart illustrating a method for mobile device advertising according to some embodiments of the present disclosure. The mobile device 102 can use the method to determine the location of the mobile device 102 and store the location on the mobile device 102.

In box 502, the location engine 312 application executes location fix technologies to determine location fixes for the mobile device 102. For example, the location engine 312 application executes the cell tower location 410 technology, the cell sector centroid 412 technology, the advanced forward link trilateration 414 technology, the global positioning system 416 technology, and the hybrid 418 technology to determine five location fixes for the mobile device 102.

In box 504, the location engine 312 application stores location fixes in the mobile device 102. For example, the location engine 312 application stores the location fixes and the location fix times for the cell tower location 410 technology, the cell sector centroid 412 technology, the advanced forward link trilateration 414 technology, the global positioning system 416 technology, and the hybrid 418 technology in the location data 402 in the mobile device 102.

In box 506, the location engine 312 application determines whether to update location fixes in the mobile device 102. For example, the location engine 312 application determines whether to update location fixes in the mobile device 102 based on a change of sector, a significant change of radio frequency fingerprint, a use of a browser on the mobile device, a call on the mobile device, a location request from the content provider, a duration of time, and an enablement of a global positioning system. If the location engine 312 application determines to update location fixes in the mobile device 102, the method returns to box 502. If the location engine 312 application determines to not yet update location fixes in the mobile device 102, the location engine 312 application periodically determines whether to update location fixes in the mobile device 102.

The update can be based on a change of sector, such as a change for the location fix for the mobile device 102 from cell tower #1844 sector alpha to cell tower #1844 sector beta. If a location fix for the mobile device 102 reflects a change of sectors every few minutes, this change can indicate that the mobile device 102 is in a moving automobile, such that the advertisement provider server 114 selects audio advertisements for the mobile device 102 because the user of the mobile device 102 can still listen to audio advertisements even if the user is driving the moving automobile.

The update can be based on a significant change of radio frequency fingerprint, where the radio frequency fingerprint is for the signals from the various cell towers presently in range for the mobile device 102. A significant change of radio frequency fingerprint can indicate that the mobile device 102 has moved significantly since the previous location fix of high accuracy was executed. The absence of a significant change in the radio frequency fingerprint can indicate an absence of significant movement for the mobile device 102. A significant change in the radio frequency fingerprint can be a change in signals from the various cell towers presently in range of the mobile device 102 that rises above a specified threshold level, such that the change indicates movement of the mobile device 102 that is likely to have a material bearing on the decision-making process of the advertisement provider server 114. For example, if an advertisement provider does not want to send an advertisement to numerous mobile device users who are not attending a football game, a significant change in the radio frequency fingerprint can reflect the amount of movement that indicates a user of the mobile device 102 left the football game.

The update can be based on a use of the web browser 306 application on the mobile device 102. If the user of the mobile device 102 activates the web browser 306 application, the most recent high accuracy location fix may have been executed a significant time ago. Although any request for content currently made through the activation of the web browser 306 application will use the stale high accuracy location fix, an update executed in the background can produce a recent high accuracy location fix for subsequent requests for content.

The update can be based on a call on the mobile device 102. If the user makes a call on the mobile device 102, the most recent high accuracy location fix may have been executed a significant time ago. Although any request for content currently made through the call made on the mobile device 102 will use the stale high accuracy location fix, an update executed in the background can produce a recent high accuracy location fix for subsequent requests for content.

The update can be based on a location request from the content provider server 112, such as when an advertisement provider server 114 is prepared to transmit an advertisement designed for mobile devices that are located in a football stadium where a football game is being played. The content provider may charge the advertisement provider more for advertisements designed for mobile devices located in the football stadium during the football game, such that the content provider needs to determine how many mobile devices are located in the football stadium during the football game and to determine how many advertisements designed for these mobile devices are transmitted to these mobile devices. The high accuracy location fix technologies may have been executed a significant time ago for many of the mobile devices located in the football stadium during the football game. The content provider server 112 can transmit a location request that specifies a cell tower proximity and a time required for a location fix update. For example, the content provider server 112 can transmit a location request to all of the mobile devices that are communicating through the cell tower #1844, the cell tower closest to the football stadium, or all of the cell towers on wheels that are present at the football game. All of the mobile devices communicating through the cell tower #1844 may begin to execute an update in background. The content provider server 112 can also specify the time required for a location fix update. If the mobile device 102 cannot execute the update request in background within the time specified, such as 15 seconds, the update request can be terminated.

The update can be based on a duration of time, such as on an hourly basis. Because low accuracy location fix technologies can execute quickly in the background without requiring significant time or resources for the mobile device 102 and the network 110, updates based on the duration of time tend to be for high accuracy location fix technologies that require significant time or resources for the mobile device 102 and the network 110. The location engine application 312 can also wait for the duration of time before executing low accuracy location fix technologies. If the location fix from a low accuracy location fix technology does not indicate a significant change from a previous location fix from the low accuracy location fix technology, then the location engine application 312 can wait for another duration of time before checking for the need of an update. However, if the location fix from the low accuracy location fix technology indicates a significant change from the previous location fix from the low accuracy location fix technology, then the location engine application 312 can execute high accuracy location fix technologies.

The update can be based on an enablement of the global positioning system, such as when the mobile device 102 is taken from indoors to outdoors. The update based on the enablement of the global positioning system can be executed in combination with the update based on the duration of time, such as periodic checks of global positioning system enablement based on the passage of time.

Figure 6:
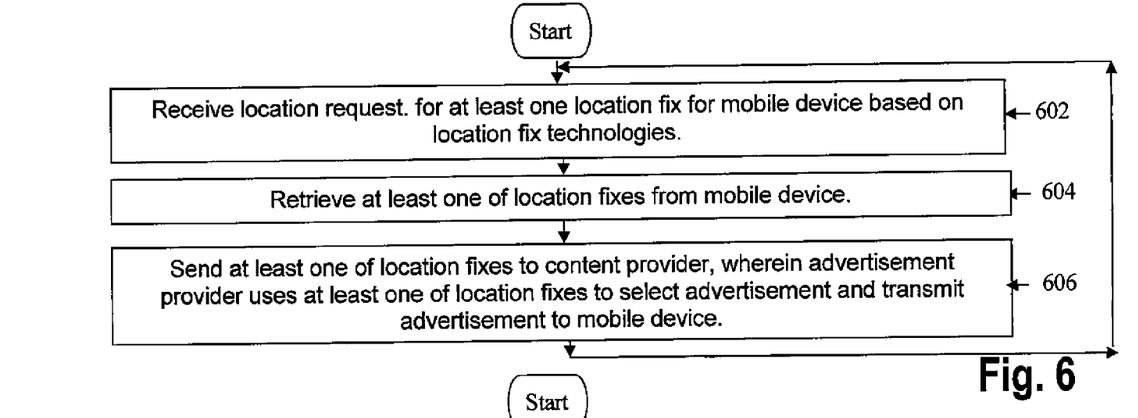
FIG. 6 shows a flowchart of another method for mobile device advertising according to some embodiments of the present disclosure.

FIG. 6 is a flowchart illustrating a method for mobile device advertising according to some embodiments of the present disclosure. The mobile device 102 can use the method to receive location requests, retrieve locations fixes, and send location fixes to the content provider server 112.

In box 602, the location engine 312 application receives a location request for at least one location fix for the mobile device 102 based on multiple location fix technologies. For example, the location engine 312 application receives a location request from the web browser 306 application for the location fixes for the mobile device 102 based on the cell tower location 410 technology, the cell sector centroid 412 technology, the advanced forward link trilateration 414 technology, the global positioning system 416 technology, and the hybrid 418 technology.

In box 604, the location engine 312 application retrieves at least one stored location fix from the mobile device 102. For example, the location engine 312 application retrieves the location fixes for the cell tower location 410 technology, the cell sector centroid 412 technology, the advanced forward link trilateration 414 technology, the global positioning system 416 technology, and the hybrid 418 technology stored in the location data 402 in the mobile device 102.

In box 606, the location engine 312 application sends at least one stored location fix to the content provider server 112. For example, the location engine 312 application sends the location fixes for the cell tower location 410 technology, the cell sector centroid 412 technology, the advanced forward link trilateration 414 technology, the global positioning system 416 technology, and the hybrid 418 technology stored in the location data 402 in the mobile device 102 to the web browser 306 application. The web browser 306 application sends the location fixes for the mobile device 102 with a content request to the content provider server 112. When the location engine 312 application completes execution of box 606, the location engine 312 application returns to box 602 to wait for more location requests. Alternatively, if the location engine 312 application has recently executed a high accuracy location fix technology, such as within a specified period of time, the location engine 312 application can select to send only the location fix determined by the recently executed high accuracy location fix technology to the content server 112.

Figure 7:
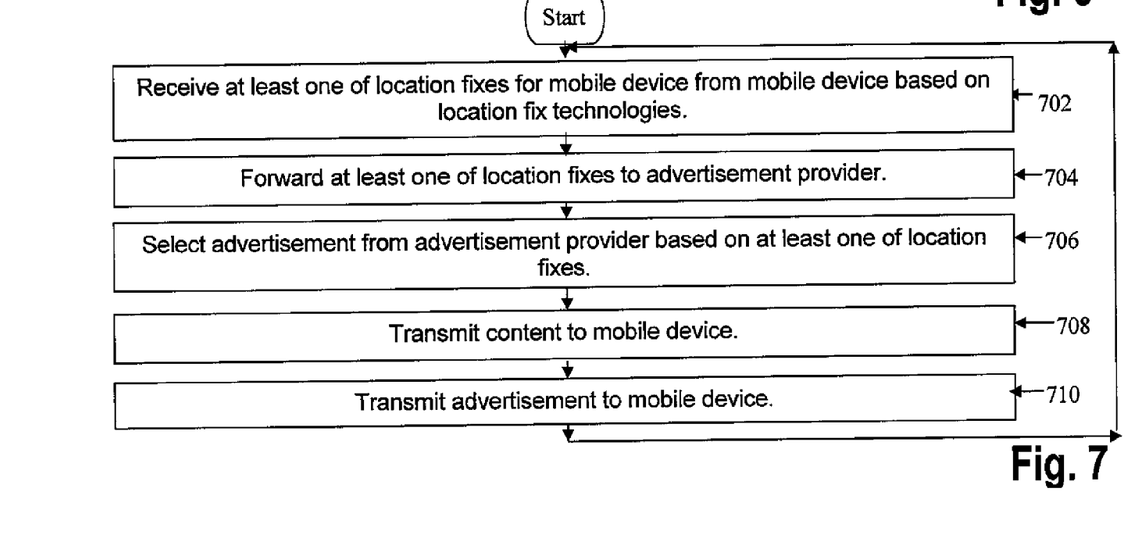
FIG. 7 shows a flowchart of yet another method for mobile device advertising according to some embodiments of the present disclosure.

FIG. 7 is a flowchart illustrating a method for mobile device advertising according to some embodiments of the present disclosure. The mobile device advertising system 100 can use the method to select and transmit advertisements to the mobile device 102 based on the location of the mobile device 102.

In box 702, the content provider server 112 receives at least one location fix for the mobile device 102 from the mobile device 102 based on multiple location fix technologies. For example, the content provider server 112 receives the location fixes for the mobile device 102 based on the cell tower location 410 technology, the cell sector centroid 412 technology, the advanced forward link trilateration 414 technology, the global positioning system 416 technology, and the hybrid 418 technology stored in the location data 402 in the mobile device 102.

In box 704, the content provider server 112 forwards at least one location fix to the advertisement provider server 114. For example, the content provider server 112 forwards the location fixes based on the cell tower location 410 technology, the cell sector centroid 412 technology, the advanced forward link trilateration 414 technology, the global positioning system 416 technology, and the hybrid 418 technology to the advertisement provider server 114. Alternatively, the content provider server 112 can select the most accurate location fix available based on parameters previously provided by the advertisement provider server 114 to ensure that an advertisement designed for mobile device users attending an event is transmitted only to mobile devices within the location tolerance of the event.

In box 706, the advertisement provider server 114 selects an advertisement based on at least one location fix. For example, the advertisement provider designs an advertisement for mobile device users attending a football game. The advertisement provider inputs the location for the stadium where the game is being played, a location tolerance, and a time tolerance into the advertisement provider server 114. When the advertisement provider server 114 receives at least one location fix from the content provider server 112, the advertisement provider server 114 selects at least one location fix to compare to the location of the stadium input by the advertisement provider.

The advertisement provider server 114 can select the most accurate location fix available to ensure that the advertisement designed for mobile device users attending the football game is transmitted only to mobile devices within the location tolerance of the stadium location. If the most accurate location fix available is a location fix within the location tolerance of the stadium location, but the time for the location fix is not within the time tolerance of the current time, the advertisement provider server 114 can select the most recent location fix available. Selecting the most recent location fix available increases the chances that the advertisement designed for mobile device users attending the football game is transmitted only to mobile devices that are currently within the location tolerance of the stadium. If the most recent location fix available is within the time tolerance of the current time, but the location fix is not a location fix accurate enough to determine whether the mobile device 102 is within the location tolerance of the stadium location, the advertisement provider server 114 can select a more accurate location fix with a less recent location fix time. Based on the location, the location tolerance, and the time tolerance input by the advertisement provider, the advertisement provider server 114 can determine if any of the location fixes are within the location tolerance of the location for the stadium and the time tolerance of the current time.

If one of the location fixes is within the location tolerance of the location for the stadium and the time tolerance of the current time, the advertisement provider server 114 selects the advertisement designed for mobile device users attending the football game. Additionally, the advertisement provider server 114 can evaluate if the demographics for mobile device users currently determined to be at the football game matches the demographics for the designed advertisement. For example, the advertisement designed for the football game is specifically designed for males between the ages of 25 and 35.

Network service providers can offer a network service discount to each mobile device user that completes a demographic survey. Each content request is transmitted with a network access identifier that uniquely identifies the requesting mobile device user. The advertisement provider server 114 can use the network access identifier to determine if stored demographic surveys indicate that a mobile device user meets the required demographic information. If none of the location fixes are within the location tolerance of the location for the stadium and the time tolerance of the current time, or if the mobile device user is not identified as meeting the required demographic information, the advertisement provider server 114 selects another advertisement.

In box 708, the content provider server 112 transmits content to the mobile device 102. For example, the advertisement provider server 114 provides a uniform resource locater for the selected advertisement to the content provider server 112, and then the content provider server 112 transmits the content requested by the mobile device 102 along with the uniform resource locater for the selected advertisement to the mobile device 102. Alternatively, in some embodiments the advertisement provider server 114 provides the selected advertisement to the content provider server 112, and then the content provider server 112 transmits the content requested by the mobile device 102 along with the selected advertisement to the mobile device 102.

In box 710, the advertisement provider server 114 transmits the advertisement to the mobile device 102. For example, after the mobile device 102 receives the content requested by the mobile device 102 along with the uniform resource locater for the selected advertisement, the mobile device 102 uses the uniform resource locater for the selected advertisement to request the selected advertisement from the advertisement provider server 114, and then the advertisement provider server 114 transmits the selected advertisement to the mobile device 102. Alternatively, in some embodiments the advertisement provider server 114 indirectly transmits the selected advertisement to the mobile device 102 by providing the selected advertisement to the content provider server 112, whereby the content provider server 112 transmits the content requested by the mobile device 102 along with the selected advertisement to the mobile device 102.

Figure 8:
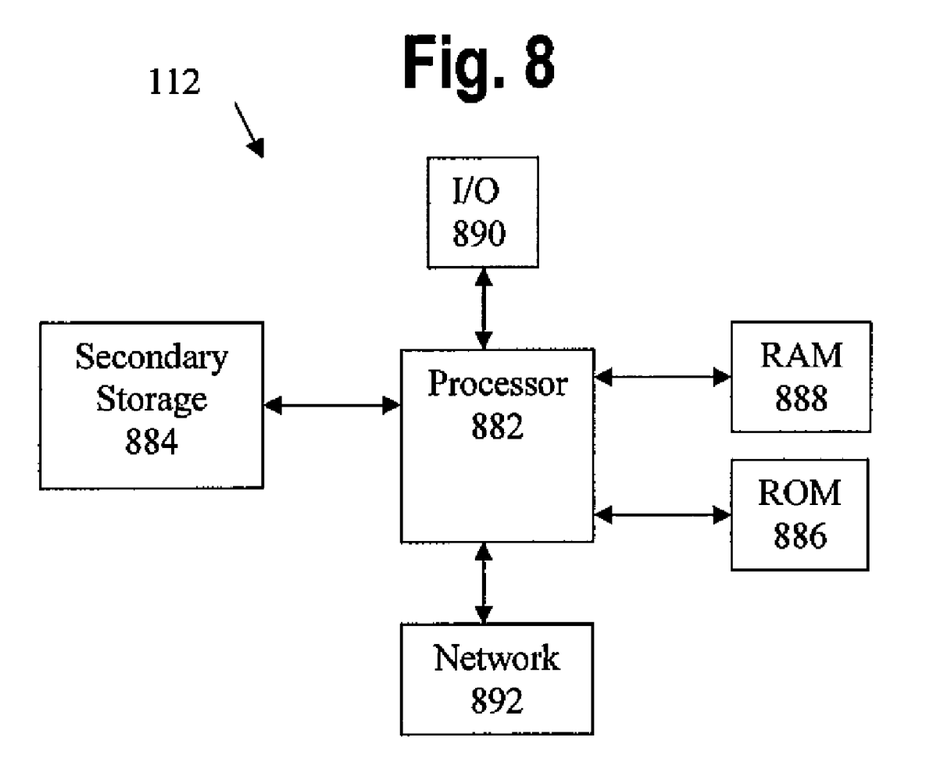
FIG. 8 shows an illustrative general purpose computer system suitable for implementing portions of the several embodiments of the present disclosure.

Parts of the system described above may be implemented on any general-purpose server with sufficient processing power, memory resources, and network throughput capability to handle the necessary workload placed upon it. FIG. 8 illustrates the content provider server 112, which is suitable for implementing one or more embodiments disclosed herein. The content provider server 112 includes a processor 882 (which may be referred to as a central processor unit or CPU) that is in communication with memory devices including secondary storage 884, read only memory (ROM) 886, random access memory (RAM) 888, input/output (110) 890 devices, and network connectivity devices 892. The processor 882 may be implemented as one or more CPU chips.

The secondary storage 884 is typically comprised of one or more disk drives or tape drives and is used for non-volatile storage of data and as an over-flow data storage device if the RAM 888 is not large enough to hold all working data. The secondary storage 884 may be used to store programs that are loaded into the RAM 888 when such programs are selected for execution. The ROM 886 is used to store instructions and perhaps data that are read during program execution. The ROM 886 is a non-volatile memory device that typically has a small memory capacity relative to the larger memory capacity of secondary storage. The RAM 888 is used to store volatile data and perhaps to store instructions. Access to both the ROM 886 and the RAM 888 is typically faster than to secondary storage 884.

The I/O 890 devices may include printers, video monitors, liquid crystal displays (LCDs), touch screen displays, keyboards, keypads, switches, dials, mice, track balls, voice recognizers, card readers, paper tape readers, or other well-known input devices. The network connectivity devices 892 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity 892 devices may enable the processor 882 to communicate with an Internet or one or more intranets. With such a network connection, it is contemplated that the processor 882 might receive information from the network, or might output information to the network in the course of performing the above-described method steps. Such information, which is often represented as a sequence of instructions to be executed using processor 882, may be received from and outputted to the network, for example, in the form of a computer data signal embodied in a carrier wave.

Such information, which may include data or instructions to be executed using processor 882 for example, may be received from and outputted to the network, for example, in the form of a computer data baseband signal or signal embodied in a carrier wave. The baseband signal or signal embodied in the carrier wave generated by the network connectivity 892 devices may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 882 executes instructions, codes, computer programs, scripts that it accesses from hard disk, floppy disk, optical disk (these various disk based systems may all be considered the secondary storage 884), the ROM 886, the RAM 888, or the network connectivity devices 892.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as directly coupled or communicating with each other may be coupled through some interface or device, such that the items may no longer be considered directly coupled to each other but may still be indirectly coupled and in communication, whether electrically, mechanically, or otherwise with one another. Other examples of changes, substitutions, and alterations are ascertainable by one skilled in the art and could be made without departing from the spirit and scope disclosed herein.

What is claimed is:

1. A method for mobile device advertising, comprising:
   executing a plurality of location fix technologies comprising at least one lower cost location fix technology and at least one higher cost location fix technology to determine a plurality of location fixes for a mobile device, the at least one lower cost location fix technology executed more frequently than the at least one higher cost location fix technology, and the plurality of location fixes comprising a plurality of less accurate location fixes based on the at least one lower cost location fix technology and at least one more accurate location fix based on the at least one higher cost location fix technology;
   storing the plurality of location fixes in the mobile device and a corresponding time of generation for each of the plurality of less accurate location fixes, wherein the plurality of less accurate location fixes are generated at different times; and
   sending at least one of the plurality of location fixes to an advertisement provider.

2. The method of claim 1 wherein the plurality of location fix technologies comprise at least one non-intensive location fix technology and at least one of a time intensive location fix technology and a network intensive location fix technology.

3. The method of claim 1 wherein the advertisement provider selects the advertisement based on at least one of a most accurate location fix and a most recent location fix.

4. The method of claim 1 wherein storing the plurality of location fixes comprises storing the plurality of location fixes and a corresponding time of generation for each location fix.

5. The method of claim 4 wherein storing the plurality of location fixes comprises storing at least some of the plurality of location fixes at different times and the corresponding time of generation for each location fix.

6. The method of claim 1 further comprising updating at least one of the plurality of location fixes in the mobile device based on at least one of a change of sector, a change of radio frequency fingerprint, a use of a browser on the mobile device, a call on the mobile device, a location request from the content provider, a duration of time, and an enablement of a global positioning system.

7. The method of claim 6 wherein the location request specifies a cell tower proximity and a time required for a location fix update.

8. The method of claim 1 wherein storing the plurality of location fixes comprises storing the plurality of location fix technologies, a corresponding one of the plurality of location fixes for each of the plurality of location fix technologies, and a corresponding time of generation for each of the corresponding one of the plurality of location fixes in a table in a memory on the mobile device.

9. The method of claim 1 wherein storing the plurality of location fixes comprises storing the plurality of location fix technologies, a plurality of corresponding location fixes for at least some of the plurality of location fix technologies, and a plurality of corresponding times of generation for each of the plurality of corresponding location fixes in a table in a memory on the mobile device.

10. A method for mobile device advertising, comprising:
storing a plurality of less accurate location fixes along with the corresponding times of generation as first location fixes of a plurality of location fixes for a mobile device based on a first of a plurality of location fix technologies on the mobile device, the first of the plurality of location fix technologies is a lower cost location fix technology and the plurality of less accurate location fixes are generated at different times;
storing a second more accurate location fix of the plurality of location fixes for the mobile device based on a second of the plurality of location fix technologies on the mobile device less frequently than the first of the plurality of location fixes, the second of the plurality of location fix technologies is a higher cost location fix technology;
receiving a location request for a mobile device;
retrieving at least one of the plurality of location fixes from the mobile device; and
sending, by the mobile device, the at least one of the plurality of location fixes to an advertisement provider.

11. The method of claim 10 wherein the plurality of location fix technologies comprise at least one non-intensive location fix technology and at least one of a time intensive location fix technology and a network intensive location fix technology.

12. The method of claim 10 further comprising selecting, by the advertisement provider, an advertisement based on the at least one of the plurality of location fixes.

13. The method of claim 10 wherein the plurality of location fixes comprises a corresponding time of generation for each location fix.

14. The method of claim 10 further comprising updating at least one of the plurality of location fixes in the mobile device based on at least one of a change of sector, a change of radio frequency fingerprint, a use of a browser on the mobile device, a call on the mobile device, a location request from the content provider, a duration of time, and an enablement of a global positioning system.

15. The method of claim 10 wherein sending, by the mobile device, the at least one of the plurality of location fixes to an advertisement provider comprises sending, by the mobile device, the at least one of the plurality of location fixes to a content provider.

16. A mobile device advertising system, comprising:
a mobile device to store a plurality of location fixes based on a plurality of location fix technologies, the plurality of location fixes comprising a plurality of less accurate location fixes based on at least one lower cost location fix technology, and at least one more accurate location fix based on at least one higher cost location fix technology, the mobile device to store the less accurate location fix more frequently than the more accurate location fix, wherein the mobile device stores the corresponding times of generation of the plurality of less accurate location fixes, and wherein the plurality of less accurate location fixes comprise a plurality of cell tower location fixes generated at different times;
a content provider to receive at least one of a plurality of location fixes, to forward the at least one of the plurality of location fixes to an advertisement provider, and to transmit content to the mobile device; and
the advertisement provider to select an advertisement based on the at least one of the plurality of location fixes, and to transmit the advertisement to the mobile device.

17. The system of claim 16 wherein the plurality of location fix technologies comprise at least one of cell tower location and cell sector centroid, and at least one of advanced forward link trilateration, global positioning system, and a hybrid location fix technology.

18. The system of claim 16 wherein the advertisement provider selects the advertisement based on at least one of a most accurate location fix and a most recent location fix.

19. The system of claim 16 wherein the mobile device stores the plurality of location fixes and a corresponding time of generation for each location fix.

20. The system of claim 19 wherein the mobile device stores at least some of the plurality of location fixes at different times and the corresponding time of generation for each location fix.

21. The system of claim 16 wherein the mobile device updates at least one of the plurality of location fixes in the mobile device based on at least one of a change of sector, a change of radio frequency fingerprint, a use of a browser on the mobile device, a call on the mobile device, a location request from the content provider, a duration of time, and an enablement of a global positioning system.

22. The system of claim 16 wherein the at least one lower cost location fix technology comprises at least one of cell tower location and cell sector centroid, and wherein the at least one higher cost location fix technology comprises at least one of advanced forward link trilateration, global positioning system, and a hybrid location fix technology.

23. The system of claim 16 wherein when the advertisement provider transmits the advertisement based on the at least one of the plurality of location fixes to the mobile device, the advertisement provider transmits a request for a more accurate one of the plurality of location fixes from the mobile device.

24. The system of claim 23 wherein when the mobile device receives the request for the more accurate one of the plurality of location fixes, the mobile device executes the corresponding one of the plurality of location fix technologies.

25. A method for obtaining and storing a plurality of location fixes on a mobile device, comprising:
executing a lower cost location fix technology of a plurality of location fix technologies to determine a plurality of less accurate location fixes of a plurality of location fixes for a mobile device;
executing a higher cost location fix technology of the plurality of location fix technologies to determine a more accurate location fix of the plurality of location fixes for the mobile device less frequently than executing the lower cost location fix technology;
storing the lower cost location fix technology, the plurality of less accurate location fixes, and corresponding times of generation for each of the less accurate location fixes in a table in a memory of the mobile device, wherein the plurality of less accurate location fixes are generated at different times; and
storing the higher cost location fix technology, the more accurate location fix, and a corresponding time of generation for the more accurate location fix in the table in the memory of the mobile device.

26. The method of claim 25 wherein at least some of the plurality of location fixes are stored at different times.

27. The method of claim 25 wherein the lower cost location fix technology comprises at least one of cell tower location and cell sector centroid, and wherein the higher cost location fix technology comprises at least one of advanced forward link trilateration, global positioning system, and a hybrid location fix technology.

28. The method of claim 25 wherein the table stores two cell tower location fixes generated at different times and corresponding times of generation associated with each of the two cell tower location fixes and a global positioning system location fix with a corresponding time of generation associated with the global positioning system location fix.

* * * * *